United States Patent

[11] 3,592,438

| [72] | Inventors | Thomas Eric Greenwood<br>RonaldEdward Farnfield, both of<br>Plymouth, England |
|---|---|---|
| [21] | Appl. No. | 832,895 |
| [22] | Filed | June 13, 1969 |
| [45] | Patented | July 13, 1971 |
| [73] | Assignee | Tecalemit (Engineering) Limited<br>Plymouth, England |
| [32] | Priority | June 14, 1968, Dec. 16, 1968 |
| [33] | | Great Britain |
| [31] | | 28586/68 and 29734/68 |

[54] SOLENOID VALVES
3 Claims, 5 Drawing Figs.

[52] U.S. Cl. ............................................. 251/84,
251/139
[51] Int. Cl. ........................................... F16k 31/06
[50] Field of Search ............................. 251/139, 84

[56] References Cited
UNITED STATES PATENTS
2,391,129  12/1945  Chambers .................... 251/139 X

| 2,642,478 | 6/1953 | Laskey et al. | 251/139 X |
| 2,876,753 | 3/1959 | Chandler | 251/139 X |
| 2,947,284 | 8/1960 | Nicholson | 251/139 X |
| 3,007,672 | 11/1961 | Tischler | 251/139 |
| 3,178,151 | 4/1965 | Laldwell | 251/139 X |

FOREIGN PATENTS
| 463,501 | 3/1950 | Canada | 251/139 |
| 1,106,163 | 7/1955 | France | 251/139 |

*Primary Examiner*—Arnold Rosenthal
*Attorney*—Mason, Kolehmainen, Rathburn & Wyss ABSTRACT: A solenoid-operated valve including an elongated, continuous, fluid conduit having a valve seat adjacent one end and a pole piece adjacent the other. A hollow armature sleeve is slidably disposed in the fluid conduit for movement between the valve seat and pole piece and the sleeve is biased away from the pole piece toward the seat. A solenoid coil is mounted around and exteriorly of the fluid conduit offset longitudinally of the pole piece and a self-centering valve member is carried at the end of the armature sleeve for movement toward and away from the valve seat.

PATENTED JUL 13 1971

INVENTORS
THOMAS ERIC GREENWOOD
RONALD EDWARD FARNFIELD

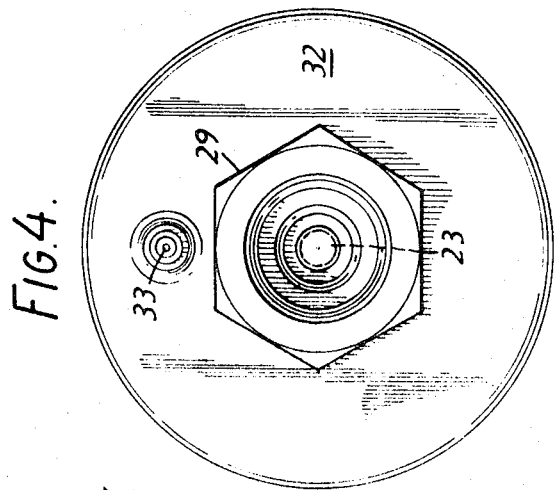
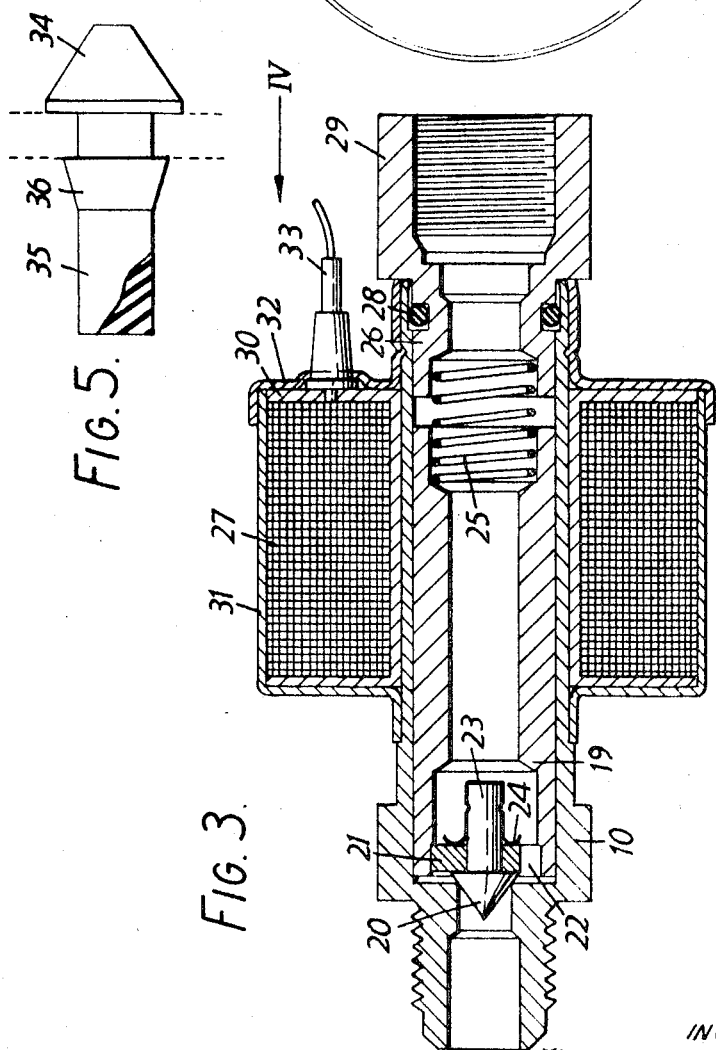

SOLENOID VALVES

This invention relates to fluid valves operated by means of a solenoid. The invention allows the construction of valves which are useable with liquids or gaseous materials.

It is known to move a valve member relative to its seat by using an electromagnetic coil. Thus, when the coil is actuated by passage of an electric current the magnetic field produced moves the valve member.

The present invention provides a fluid valve comprising a conduit within which is a valve member movable against a biasing force by an armature within the conduit which is actuated by the application of the magnetic field of a solenoid coil adjacent the conduit.

The invention allows a compact construction of a solenoid fluid valve to be achieved and passage of fluid through the conduit assists in the cooling of the coil. The valve according to the invention is of value in controlling the flow of fuel in engines and is of particular value in motor vehicles. However, limitation of the invention to this field is not contemplated and the valve according to the invention is of broad utility. The valves of the invention are of simple construction and economic to manufacture, they may also be constructed so as to give a low resistance to flow.

Preferably, the parts of the valve not intended to be in the magnetic circuit are made from nonmagnetic materials and the parts within the magnetic circuit are made from materials having a relatively high magnetic permeability.

Preferably, the conduit passes through the coil and the armature may be adapted for the passage of fluid through it preferably by being in the form of a slidable hollow sleeve. The valve will preferably be closed by the valve member being biased onto its seat and movable therefrom when the coil is actuated.

In alternative forms of moving the valve member, the armature may be attached to the member or may have a projection which moves the valve member and may be separable therefrom.

The fluid valve may include a pole piece towards which the armature moves when the coil is actuated. The valve member may have a variety of forms for example a ball, disc or poppet.

Two embodiments of the invention will now be described by way of example with reference to the accompanying diagrammatic drawings in which:

FIG. 3 is a longitudinal section of another embodiment,

FIG. 4 is an end view of FIG. 3 from the direction of arrow IV in FIG. 3 and

FIG. 5 shows a modified valve member.

Figure 2:
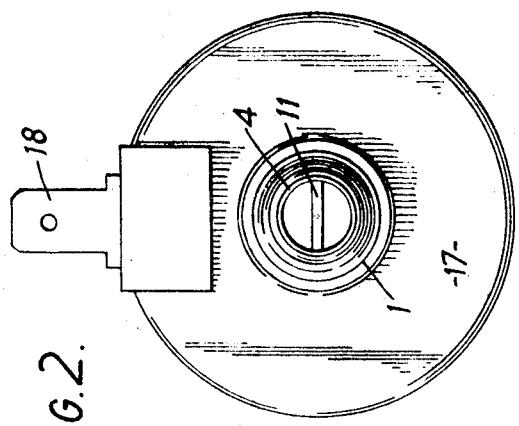
FIG. 2 is an end view of FIG. 1 from the direction of arrow II in FIG. 1.

The valve comprises a body 1 having a recessed flange 2 at one end and a central cylindrical portion within which a hollow armature 3 can freely slide. At the other end of the body is a connection spigot 4. The body forms a conduit for the passage of fluid. A valve housing 5 has a recessed flange 6 and includes a cavity in which are positioned a valve member 7, formed as a ball, and a biassing spring 8. The housing 5 has a connection spigot 9.

The hollow armature 3 is formed from a tubular member and a projection 11 which projects from one end of the tubular member towards the member 7. A washer of elastomeric material forms a valve seat 13 for the valve member 7. Body 1 and valve housing 5 are joined together by a swagging operation, thus compressing the outer part of the valve seat 13 so as to effect a leakproof joint between these two parts. The member 7 is urged on to the valve seat 13 by the spring 8, the other end of which abuts the end of the cavity in the valve housing 5. Body 1, valve housing 5 and valve member 7 are made from nonmagnetic materials, and the armature 3 and a pole piece 12 are made from materials having relatively high magnetic permeability.

A coil 14 wound on a former 15 is positioned around the body 1, the armature being displaced from the center of the coil in the direction away from the valve member 7.

The coil 14 is enclosed within a housing constructed in two parts, a cover 16 and a cap 17. Those two parts are made of material having relatively high magnetic permeability and in conjunction with the armature 3 and the pole piece 12 form a path for the magnetic flux.

Figure 1:
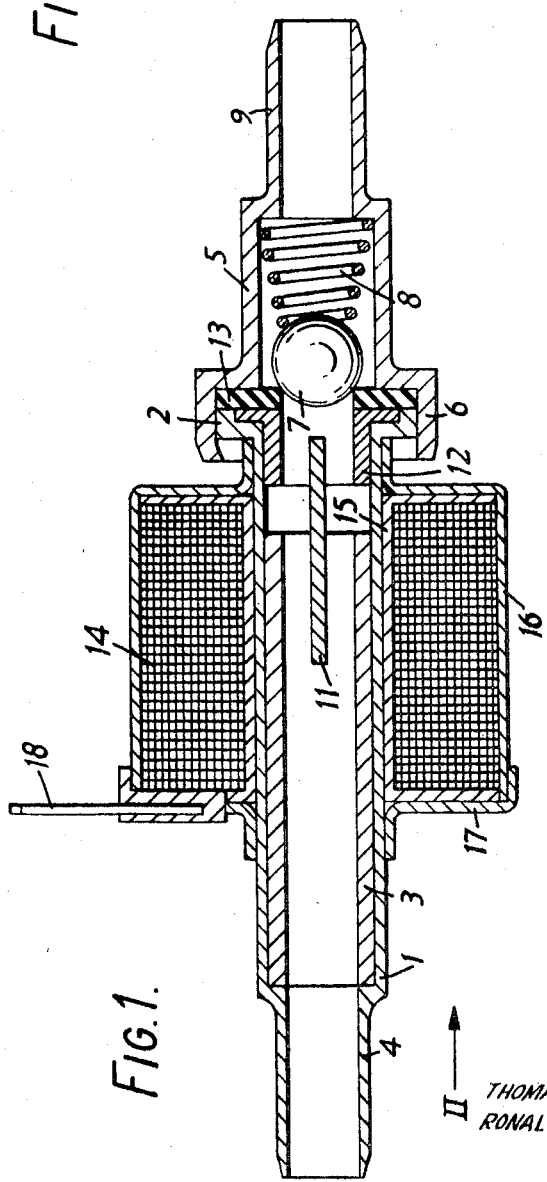
FIG. 1 is a longitudinal section of one embodiment.

If the coil is wound on a former, suitable terminals 18 may be attached to or moulded within the flanges of the former. In FIG. 1 one such terminal is illustrated, and one end of the coil wire is connected to it and since this embodiment is intended for automotive use the other end of the coil wire is earthed to the cap 17. In such applications the cover 16 is provided with a mounting bracket (not shown) for attachment to the vehicle thus completing a circuit to the earth connection.

When an electrical current passes through the coil 14 the armature 3 is urged towards the pole piece 12. Dimensions are arranged so that the projection 11 engages the valve member 7 at a predetermined distance before the armature 3 contacts the pole piece 12. Thus the valve member 7 is lifted from the seat 13 when the armature 3 is stopped by the pole piece 12 and fluid can then flow through the valve. When the coil 14 is deenergized the valve member 7 returns to the seat under the action of the spring 8 thus stopping fluid flow.

Fluid flow may be in either direction. Assume the direction of flow is from the armature 3 to the valve seat 13. In this case the spring 8 must be designed to exert a greater force on the valve member 7 than the fluid pressure exerts. The solenoid system is designed to provide a force greater than the difference between the spring force and the fluid force on the valve. Assume the direction of flow is from the valve seat 13 towards the armature 3. In this condition both the spring force and the fluid pressure urge the valve member 7 onto the valve seat 13. The solenoid system must be designed to produce a force sufficient to overcome the effect of the combined forces acting on the valve member 7.

The second embodiment comprises an elongate hollow body 10 within which is slidable a hollow armature 19 having a central bore through which fluid passes. The armature carries at one end a conical valve member 20 having a stem 23 extending into the hollow armature through valve support member 21. This support member has at least one duct 22 for the passage of fluid through the armature past the valve member. The central hole through the valve support 21 is preferably larger than the stem of the valve member 20 to permit this member to centralize itself relative to the valve seat formed within the body 10. The base of the valve member 20 is held in contact with the support member 21 by means of spring clips 24 which contact and grip the stem 23.

In a modification of the valve member and its stem, the clips are dispensed with by forming an annular flare on the stem, as shown in FIG. 5. The valve member 34 and stem 35 are formed of resilient material and an annular flare 36 is formed on the stem. The valve stem is inserted into an apertured support member, the flare 36 is inwardly compressed as it passes through the aperture and expands outwardly when past the aperture so that the valve support 21 occupies the position indicated by dotted lines. FIG. 5 also discloses the use of a truncated valve member.

The armature 19 is biased from a pole piece 26 by a helical spring 25. Thus valve member 20 is held against its seat on body 10 by the biasing spring when the solenoid is not actuated. The pole piece is joined to body 10 by any suitable means, for example, swagging, threaded connection with the aid of a sealing ring 28. The pole piece is integral with a threaded socket 29.

A solenoid coil 27 wound on a former 30 embraces the body 10 and has a cover 31 and cap 32. Electrical energy is supplied to the coil via terminal 33 and an earth connection can conveniently be taken from cover 31. The cap 32 is swaged onto body 10 but may be extended towards socket 29 to increase the efficiency of the magnetic circuit.

The valve may be used with the fluid flow in either direction and depending on the direction of flow, the properties of biasing member 7 must be selected accordingly.

When coil 27 is actuated by the electrical supply the armature 19 is moved into the coil compressing the spring 25 and lifting the valve member 20 from its seat.

The fluid then flows through the conduit and valve. The valve closes under the force in the biasing spring when the electrical supply ceases.

In a modification the biasing spring extends through the armature to contact the support member 21. This longer spring allows a larger biasing force to be exerted on the valve member to retain it on its seat.

The pole piece 26 and armature 19 are made from materials having a relatively high magnetic permeability while body 10 is made from a nonmagnetic material.

It will be understood that the foregoing description covers a normally closed valve (when deenergized) but it will be appreciated that by reversing the armature assembly (end for end) and providing an associated seating at the appropriate end, a normally open valve (when deenergized) can be constructed.

We claim:

1. A solenoid-operated valve comprising an elongated, continuous fluid conduit having an annular valve seat adjacent one end, an annular pole piece of magnetic material adjacent the opposite end of said fluid conduit having an axial fluid passage defined therein, an annular solenoid coil mounted externally around said fluid conduit offset longitudinally with respect to said pole piece, an elongated tubular armature sleeve of magnetic material slidably disposed in said fluid conduit for movement between said pole piece and said valve seat, coil spring means seated in coaxial alignment in said fluid passage of said pole piece for biasing said armature sleeve toward said valve seat, said armature sleeve including an axial fluid passage therethrough, enlarged at opposite ends for receiving said spring means and defining a valve chamber adjacent the end facing said valve seat, valve support means mounted in said valve chamber of said armature sleeve including passage means therein for fluid flow between said valve seat and said valve chamber and defining and axial bore aligned with the bore of said annular valve seat, a valve member carried on said support means including an enlarged head adapted to open and close against said seat and including a stem extending through said bore in said support means into said valve chamber, and retaining means in said valve chamber on said stem for limiting axial movement of said valve member in said support means.

2. The solenoid valve of claim 1 wherein said bore in said valve support means is larger than said valve stem, permitting said valve member to centralize relative to said valve seat.

3. The solenoid valve of claim 1 wherein said valve member is formed of resistant material and said retaining means comprises an integrally formed annular flared collar on said stem, said collar deflected inwardly upon passage of said stem through said bore in said support means and expandable after passage therethrough to bear against a surface of said support means restraining axial movement of said valve relative thereto.

PO-1050 (5/69)

UNITED STATES PATENT OFFICE
CERTIFICATE OF CORRECTION

Patent No. 3,592,438      Dated July 13, 1971

Inventor(s) Thomas Eric Greenwood and Ronald Edward Farnfield

It is certified that error appears in the above-identified patent and that said Letters Patent are hereby corrected as shown below:

Claim 17, line 2, "resistant" should be --resilient--.

Signed and sealed this 8th day of February 1972.

(SEAL)
Attest:

EDWARD M. FLETCHER, JR.
Attesting Officer

ROBERT GOTTSCHALK
Commissioner of Patents